US012053105B1

(12) United States Patent
Ma

(10) Patent No.: US 12,053,105 B1
(45) Date of Patent: Aug. 6, 2024

(54) LIGHTED PRODUCT DISPLAY CASE

(71) Applicant: SHENZHEN CITY DONGLIN HIGH-TECH CO., LTD., Shenzhen (CN)

(72) Inventor: Zenan Ma, Shenzhen (CN)

( * ) Notice: Subject to any disclaimer, the term of this patent is extended or adjusted under 35 U.S.C. 154(b) by 0 days.

(21) Appl. No.: 18/230,661

(22) Filed: Aug. 7, 2023

(51) Int. Cl.
*F21V 23/06* (2006.01)
*A47F 3/00* (2006.01)
*F21S 4/28* (2016.01)
*A47F 3/12* (2006.01)
*F21Y 115/10* (2016.01)

(52) U.S. Cl.
CPC ................ *A47F 3/001* (2013.01); *F21S 4/28* (2016.01); *F21V 23/06* (2013.01); *A47F 3/125* (2013.01); *F21Y 2115/10* (2016.08)

(58) Field of Classification Search
CPC .. A47F 3/001; A47F 3/125; F21S 4/28; F21V 23/06; F21Y 2115/10
See application file for complete search history.

(56) References Cited

U.S. PATENT DOCUMENTS

2007/0195535 A1 * 8/2007 Artwohl .................... F21S 4/28 362/341

FOREIGN PATENT DOCUMENTS

CN 210961221 U * 7/2020
CN 214336239 U * 10/2021 ......... G09F 13/0404
CN 217852154 U * 11/2022
CN 115736567 A * 3/2023

OTHER PUBLICATIONS

English translation of Bo CN-115736567-A (Year: 2023).*
English translation of Li CN-217852154-U (Year: 2022).*
English translation of Ma CN-214336239-U published (Year: 2021).*
English translation of Lai CN-210961221-U (Year: 2020).*
Amazon.com verified purshase review of SupBro Led Clear acrylic display box by Courtney Gray published on Aug. 15, 2022. Available at https://www.amazon.com/SupBro-Led-Clear-Acrylic-Display/dp/B09J13WHSB/ref=asc (Year: 2022).*
Screenshots of images and video of Supbro product available at https://www.amazon.com/SupBro-Led-Clear-Acrylic-Display/dp/B09J13WHSB/ref=asc (Year: 2022).*

* cited by examiner

*Primary Examiner* — Evan P Dzierzynski

(57) ABSTRACT

A lighted product display case, containing two end covers and connecters; each end cover has a first lighting assembly and position limiting portions, the first lighting assembly has first contacts corresponding to the position limiting portions; each connecter has a second lighting assembly having second contacts exposed from two ends of the connecter; the first contacts are exposed to the connecters; the connecters are positioned between the two end covers, two ends of each connecter are inserted into position limiting portions of the two end covers so that a case body is formed where the first contacts contact the second contacts so that the first lighting assemblies are electrically connected with the second lighting assemblies. By removable connection between the end covers and the connecters, quick assembly is achieved, products are illuminated and the display effect enhanced. Also, moving and transportation are facilitated to reduce mobility problem and transportation cost.

8 Claims, 7 Drawing Sheets

LIGHTED PRODUCT DISPLAY CASE

BACKGROUND OF THE INVENTION

The present invention relates to the field of showcases, and more specifically relates to a lighted product display case.

During exhibitions, sellers will usually place their products in lighted product display cases to promote their products, enhance product display effect, draw customers' attention, and create a good atmosphere in the exhibition halls. However, a lighted product display case in the prior art usually has a fixed integral structure which is inconvenient to assemble and disassemble. Moreover, the existing lighted product display case is large and takes up many spaces, thus resulting in mobility problem and difficulty in transportation which increase the cost of the sellers participating in the exhibitions.

BRIEF SUMMARY OF THE INVENTION

In view of the aforesaid disadvantages now present in the prior art, it is an object of the present invention to provide a lighted product display case in accordance with the technical solutions given below:

A lighted product display case, comprising two end covers and a plurality of connecters; each of the end covers is provided with a first lighting assembly and a plurality of position limiting portions, the first lighting assembly comprises a plurality of first contacts positioned corresponding to the position limiting portions respectively and exposed to the connecters respectively; each of the connecters is provided with a second lighting assembly, and the second lighting assembly comprises an LED panel and a plurality of second contacts provided at two ends of the LED panel; the second contacts are exposed from two ends of the corresponding connecter when the second lighting assembly is installed on the corresponding connecter; the plurality of connecters are positioned between the two end covers, wherein said two ends of each of the connecters are inserted into one of the position limiting portions of one of the end covers and a corresponding position limiting portion of another one of the end covers respectively, so that a case body is formed, wherein the first contacts of both end covers are in contact with corresponding second contacts of the connecters, so that first lighting assemblies of both of the end covers are in contact with corresponding second lighting assemblies of the connecters.

Further, each of the end covers comprises an outer shell and a cover panel fixed to the outer shell, the cover panel is made of light-transmitting material; the outer shell is provided with said plurality of position limiting portions of the corresponding end cover and a plurality of openings that allow corresponding first contacts of the corresponding end cover to expose.

Further, a first supporting frame is provided inside each outer shell, the first supporting frame supports a corresponding cover panel, a surrounding groove is formed between the first supporting frame and outer peripheries of the outer shell.

In an embodiment, each first lighting assembly also comprises an LED light, a light guiding panel, and controller boards; the first contacts of the corresponding first lighting assembly are disposed on the controller boards, and a power connecter is disposed on at least one of the controller boards;

the LED light is fixed to side edges of the light guiding panel, and the LED light is also electrically connected to the controller boards.

Further, each outer shell is also provided with a second supporting frame; the second supporting frame is positioned corresponding to a middle part of the corresponding cover panel.

Further, the lighted product display case also comprises transparent side boards; each of the connecters is provided with a first locking groove on each lateral side; and a plurality of second locking grooves are provided on each of the end covers on a side facing towards the connecters; a left side and a right side of each of the transparent side boards are fitted into corresponding first locking grooves of corresponding connecters respectively, and an upper side and a bottom side of each of the transparent side boards are fitted into corresponding second locking grooves of the end covers respectively.

Further, the lighted product display case also comprises a door; the door is rotatably connected to the case body.

Further, an outer surface of at least one of the end covers is provided with anti-slippery gaskets.

In another embodiment of the present invention, the first lighting assembly also comprises controller boards and spotlights electrically connected with the controller boards; the controller boards are disposed in the surrounding groove.

Further, a middle area of a surface of each outer shell facing towards a vertical direction of the case body is made of transparent material.

The present invention has the following beneficial effects: The end covers and the connectors are removably connected so that quick assembly and disassembly can be achieved. Illumination is provided to enhance product display effects. The present invention can be disassembled to facilitate mobility and transportation, and hence reduce mobility problem and transportation costs.

DETAILED DESCRIPTION OF THE INVENTION

Figure 1:
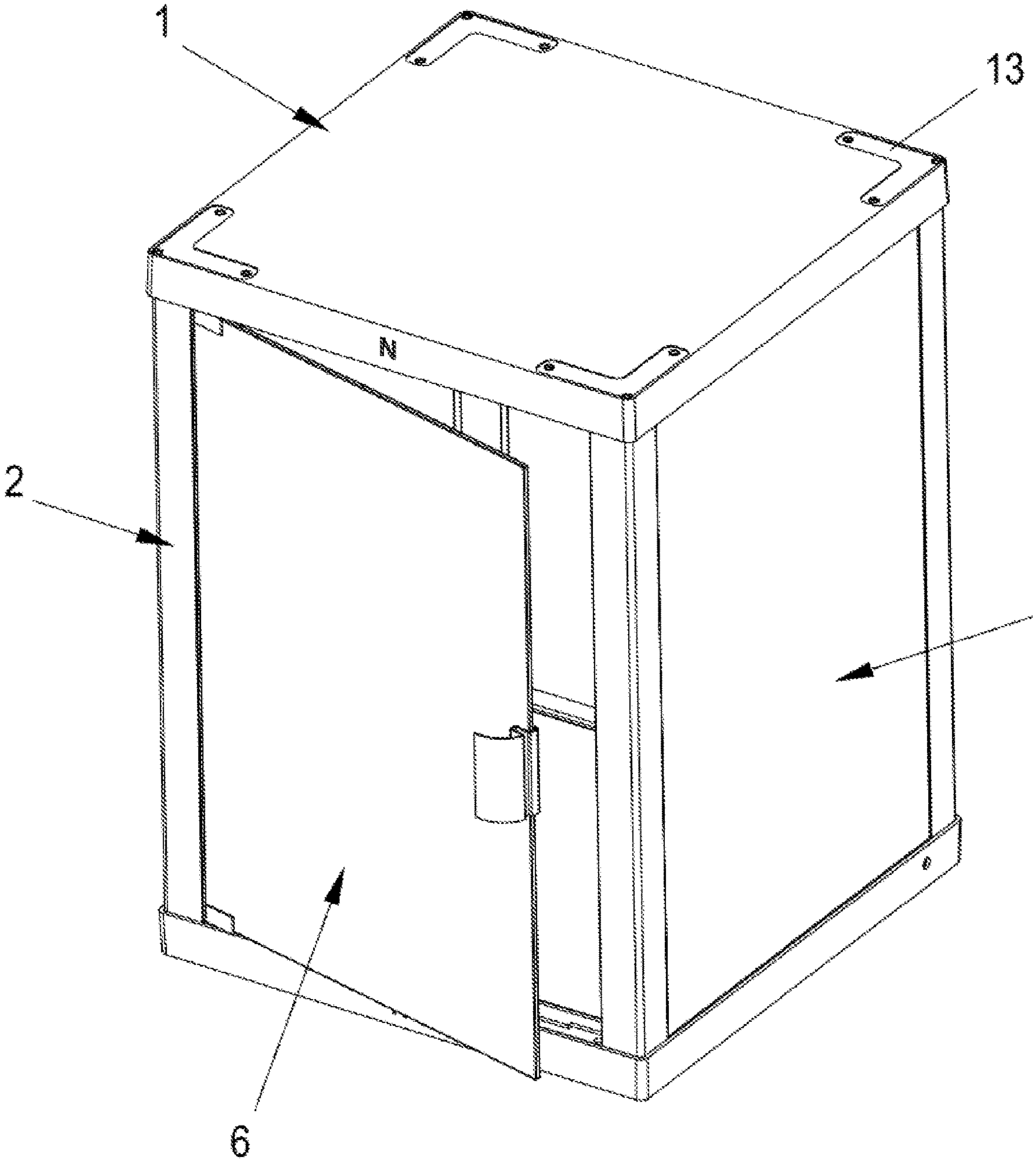
FIG. 1 is a structural view according to embodiment 1 of the present invention.
Figure 2:
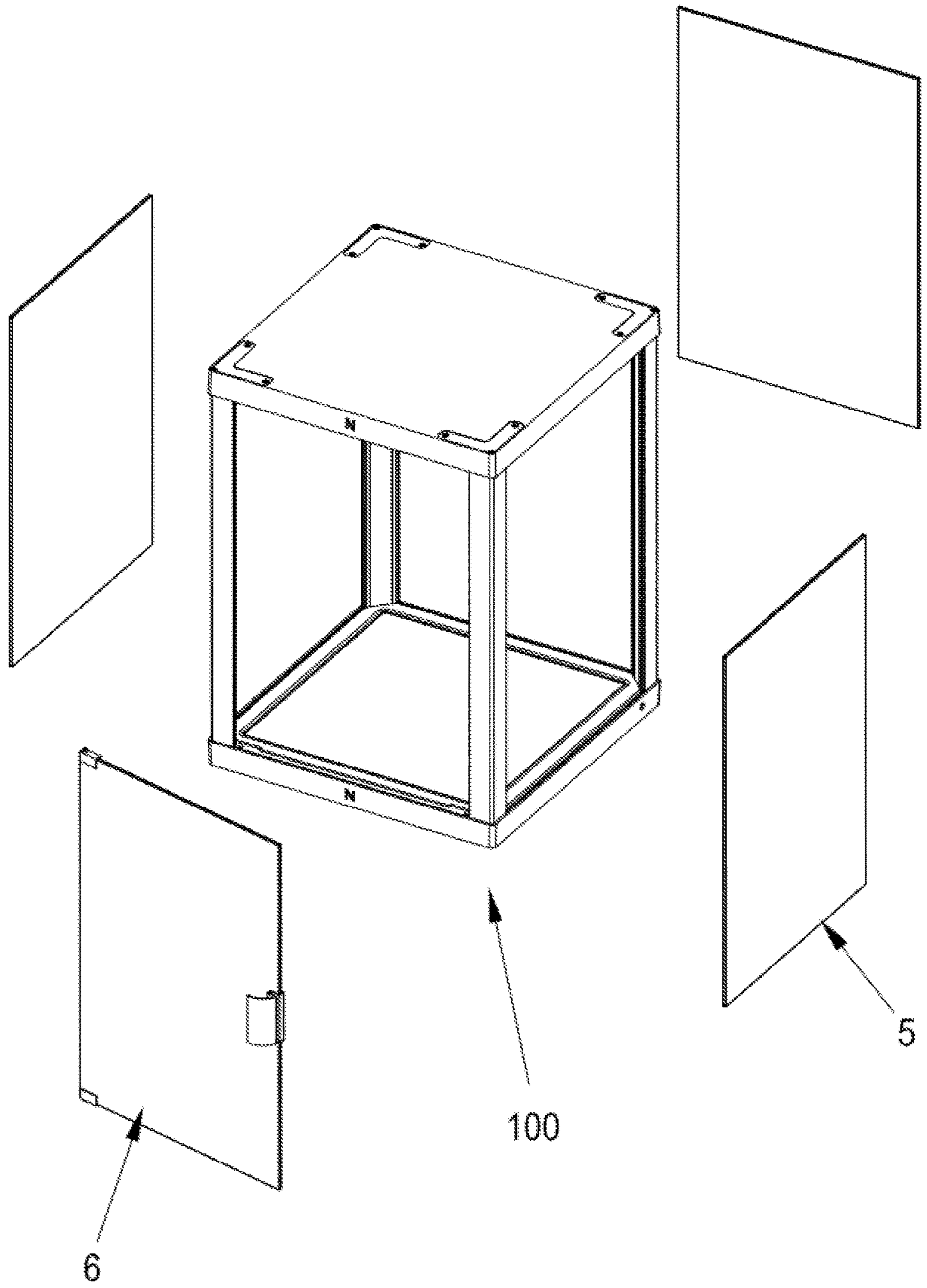
FIG. 2 is an exploded structural view according to embodiment 1 of the present invention.
Figure 3:
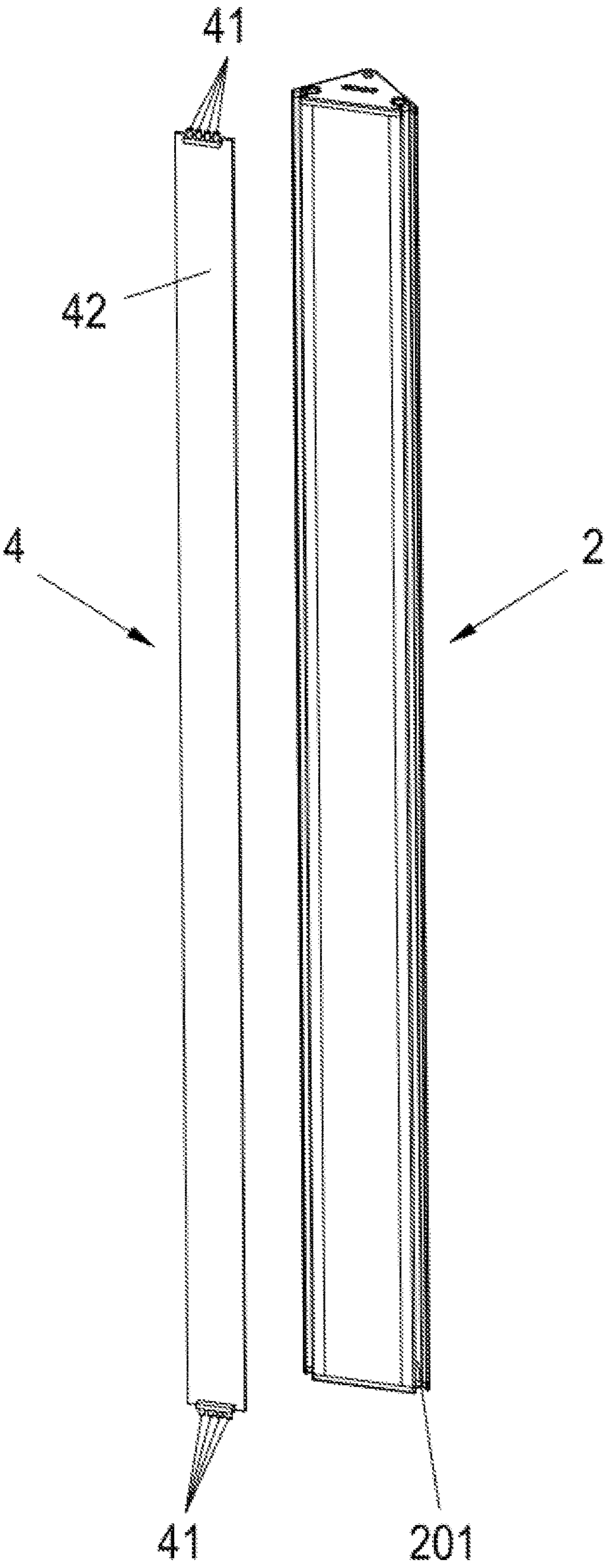
FIG. 3 is an exploded structural view of a connecter according to embodiment 1 of the present invention.
Figure 4:
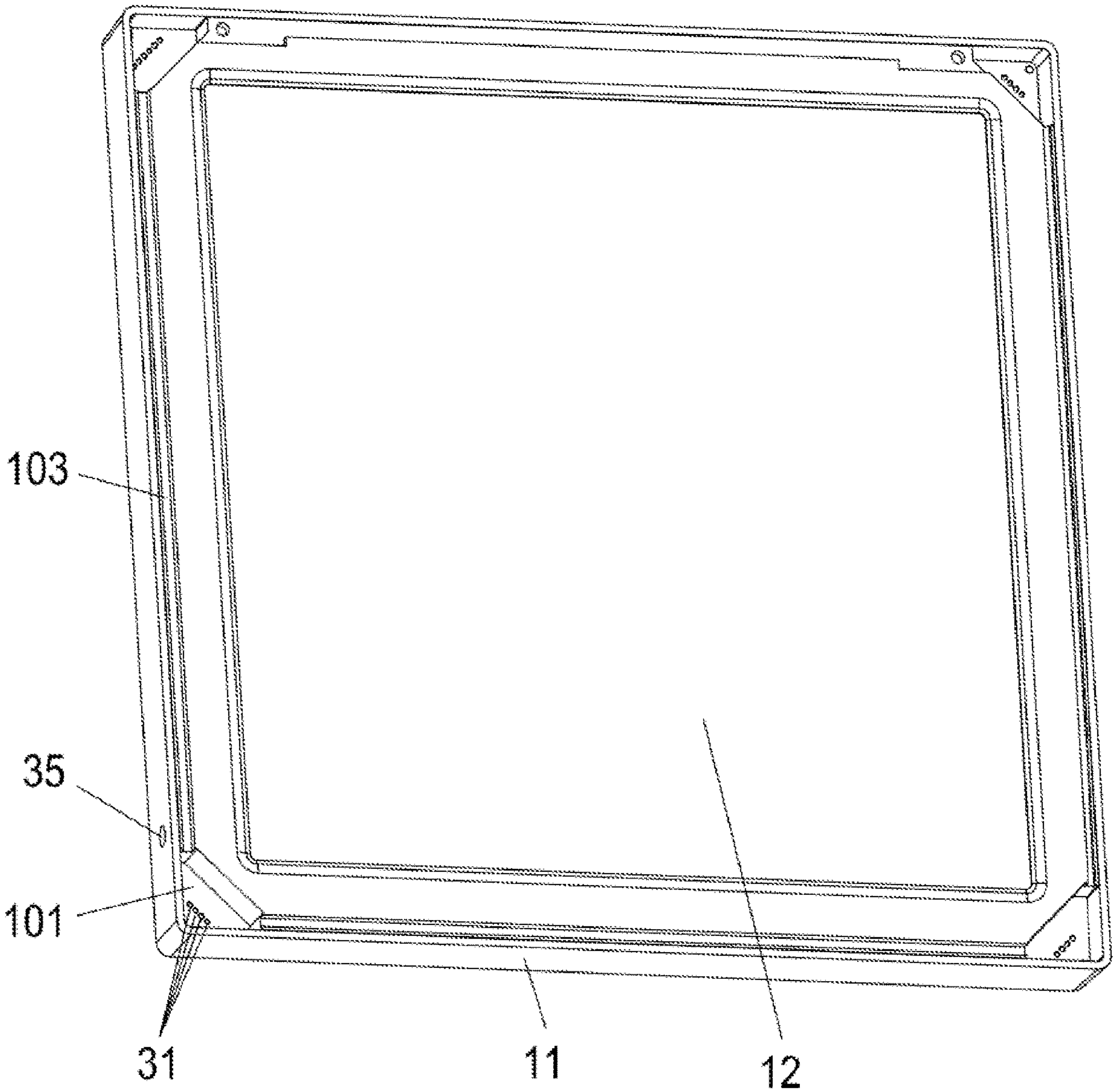
FIG. 4 is a structural view of an end cover according embodiment 1 of the present invention.
Figure 5:
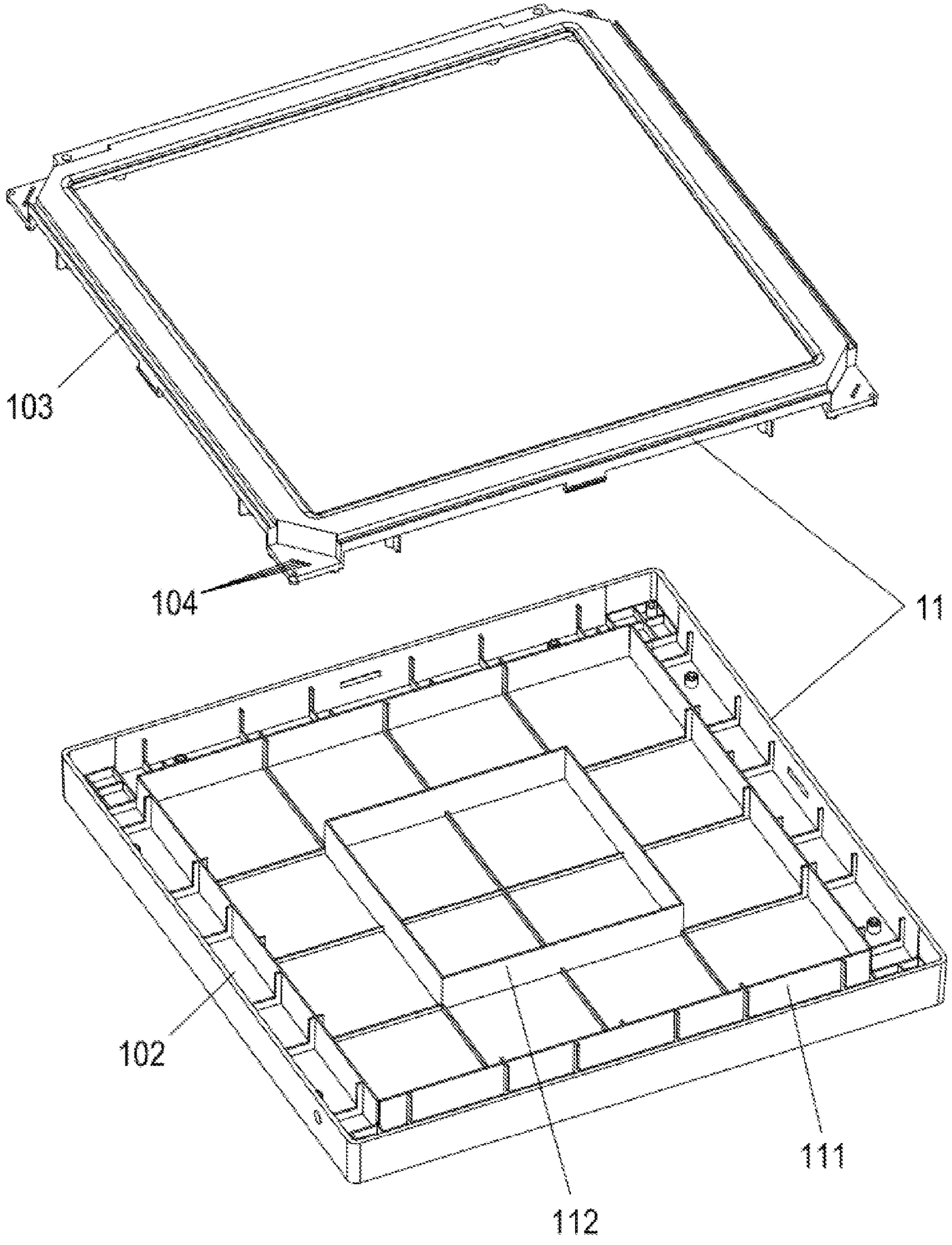
FIG. 5 is an exploded structural view of an end cover according to embodiment 1 of the present invention.
Figure 6:
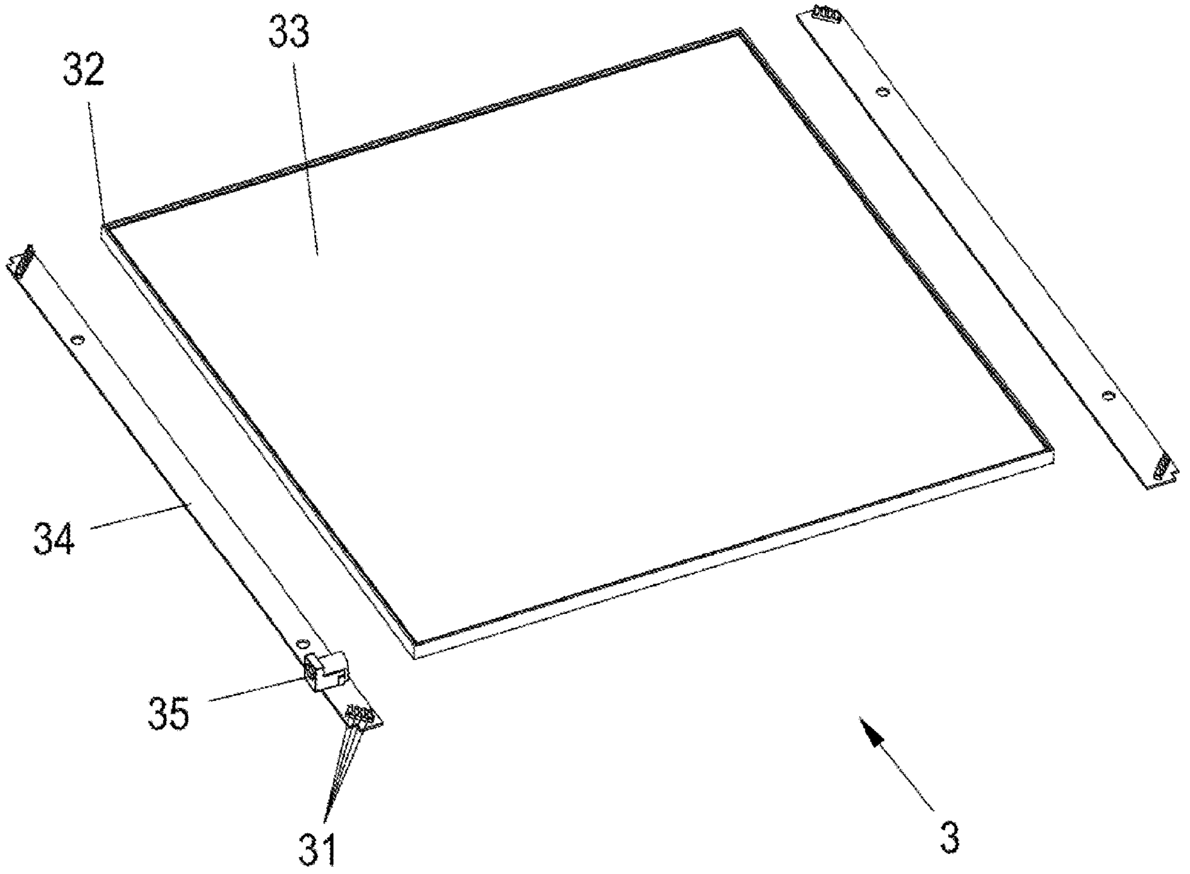
FIG. 6 is a structural view of a first lighting assembly according to embodiment 1 of the present invention.

The present invention is further described below with reference to the embodiments. The embodiments as will be described below are only some of the possible embodiments of the present invention, and they are intended only to illustrate the present invention and should not be considered limiting to the scope of the present invention.

Embodiment 1

As shown in FIGS. 1-6, a lighted product display case, comprising two end covers 1 and a plurality of connecters 2;

each of the end covers 1 is provided with a first lighting assembly 3 and a plurality of position limiting portions 101, the first lighting assembly 3 comprises a plurality of first contacts 31 positioned corresponding to the position limiting portions 101 respectively and exposed to the connecters 2 respectively; each of the connecters 2 is provided with a second lighting assembly 4, and the second lighting assembly 4 comprises an LED panel 42 and a plurality of second contacts 41 provided at two ends of the LED panel 42; the second contacts 41 are exposed from two ends of the corresponding connecter 2 when the second lighting assembly 4 is installed on the corresponding connecter 2; the plurality of connecters 2 are positioned between the two end covers 1, wherein said two ends of each of the connecters 2 are inserted into one of the position limiting portions 101 of one of the end covers 1 and a corresponding position limiting portion of another one of the end covers 1 respectively, so that a case body 100 is formed, wherein the first contacts 31 of both end covers 1 are in contact with corresponding second contacts 41 of the connecters 2, so that first lighting assemblies 3 of both of the end covers 1 are in contact with corresponding second lighting assemblies 4 of the connecters 2.

To assemble the lighted product display case according to the present embodiment of the present invention, place one of the end covers 1 on a planar surface, insert one end of each of the connecters 2 into a corresponding position limiting portion 101 of said one of the end covers 1, and then place another one of the end covers 1 on opposite ends of the connecters 2 such that the opposite ends of the connecters 2 are inserted into the position limiting portions 101 of said another one of the end covers 1 respectively. Accordingly, a case body 100 is quickly assembled. After assembly, the first contacts 31 of both end covers 1 are electrically connected with the second contacts 41 of all the connecters 2 by point-to-point contact. Once the case body is connected to a power source, the first contacts 31 and the second contacts 41 are powered such that lights are emitted from an inner bottom side and an inner upper side of the case body through the first lighting assemblies of the two covers as well as from a lateral side surface of each of the connecters 2 through the second lighting assembly 4 of each of the connecters 2 to illuminate a product placed inside the case body, thereby enhancing the display effect. Said power source can be an external power source or a built-in battery, depending on practical needs. To disassemble the lighted product display case, remove the end cover 1 at an upper side of the case body, and then remove the connecters 2 to separate the connecters 2 from both end covers 1. Accordingly, disassembly is quickly achieved. The end covers 1 and the connecters 2 can be conveniently moved and transported to solve the mobility problem and reduce the cost for transportation.

Further, each of the end covers 1 comprises an outer shell 11 and a cover panel 12 fixed to the outer shell 11, the outer shell 11 is provided with said plurality of position limiting portions 101 of the corresponding end cover 1 and a plurality of openings 104 that allow corresponding first contacts 31 of the corresponding end cover 1 to expose, so that the first contacts 31 are exposed to the connecters 2 and electrically connected to the connecters 2; the cover panel 12 is made of light-transmitting material; the first lighting assembly 3 of the corresponding end cover 1 is enclosed by the outer shell 11 and the cover panel 12 of the corresponding end cover 1. When the case body 100 is connected to the power source, lights emitted from the first lighting assembly 3 illuminate an interior of the case body 100 through the cover panel 12.

Further, a first supporting frame 111 is provided inside each outer shell 11 the first supporting frame 111 supports a corresponding cover panel 12, a surrounding groove 102 is formed between the first supporting frame 111 and outer peripheries of the outer shell 11 to accommodate components and wires of the first lighting assembly 3 of the corresponding end cover 1, so that an interior of the outer shell 11 is more clean and tidy.

Further, each first lighting assembly 3 also comprises an LED light 32, a light guiding panel 33, and controller boards 34; the light guiding panel 33 is positioned on a surface of the cover panel 12 facing the interior of the outer shell 11, so that the first supporting frame 111 supports the light guiding panel 33 and the cover panel 12; the first contacts 31 of the corresponding first lighting assembly 3 are disposed on the controller boards 34, and a power connecter 35 is disposed on at least one of the controller boards 34; the LED light 32 is fixed to side edges of the light guiding panel 33, and the LED light 32 is also electrically connected to the controller boards 34; an external power source is connected through the power connecter 35 to supply power to all the first lighting assemblies 3 and the second lighting assemblies 4 of the present invention once assembled. When powered up, the LED light 32 of each first lighting assembly 3 will emit lights which pass through the corresponding light guiding panel 33 through which the light is dispersed evenly and then illuminates the interior of the case body 100 through the corresponding cover panel 12.

Further, each outer shell 11 is also provided with a second supporting frame 112; the second supporting frame 112 is positioned corresponding to a middle part of the corresponding cover panel 12 to avoid deformation and collapse of the corresponding cover panel 12 and the corresponding light guiding panel 33 due to pressure created by excessively heavy weight of a display product in the case body.

Further, the lighted product display case also comprises transparent side boards 5 for showing as well as protecting the display product. Each of the connecters 2 is provided with a first locking groove 201 on each lateral side; and a plurality of second locking grooves 103 are provided on each of the end covers 1 on a side facing towards the connecters 2. A left side and a right side of each of the transparent side boards 5 are fitted into corresponding first locking grooves 201 of corresponding connecters 2 respectively, and an upper side and a bottom side of each of the transparent side boards 5 are fitted into corresponding second locking grooves 103 of the end covers 1 respectively. During assembly, one ends of the connecters 2 are inserted into corresponding position limiting portions 101 of one of the end covers 1, and then the transparent side boards 5 are mounted between two adjacent connecters 2 by sliding down along corresponding first locking grooves 201 of the two adjacent connecters 2 until the bottom sides of the transparent side boards 5 are locked into the second locking grooves 103 of said one of the end covers 1, finally, place another one of the end covers 1 on opposite ends of the connecters 2 in a way that the upper sides of the transparent side boards 5 are locked into the second locking grooves 103 of said another one of the end covers 1. Accordingly, assembly can be quickly achieved.

Further, the lighted product display case also comprises a door 6; the door 6 is rotatably connected to the case body 100 to facilitate access of the display product inside the case body by opening the door 6; the door 6 can also be made of transparent material for showing the display product.

Further, an outer surface of at least one of the end covers 1 is provided with anti-slippery gaskets 13 to prevent the case body 100 from moving.

Embodiment 2

Figure 7:
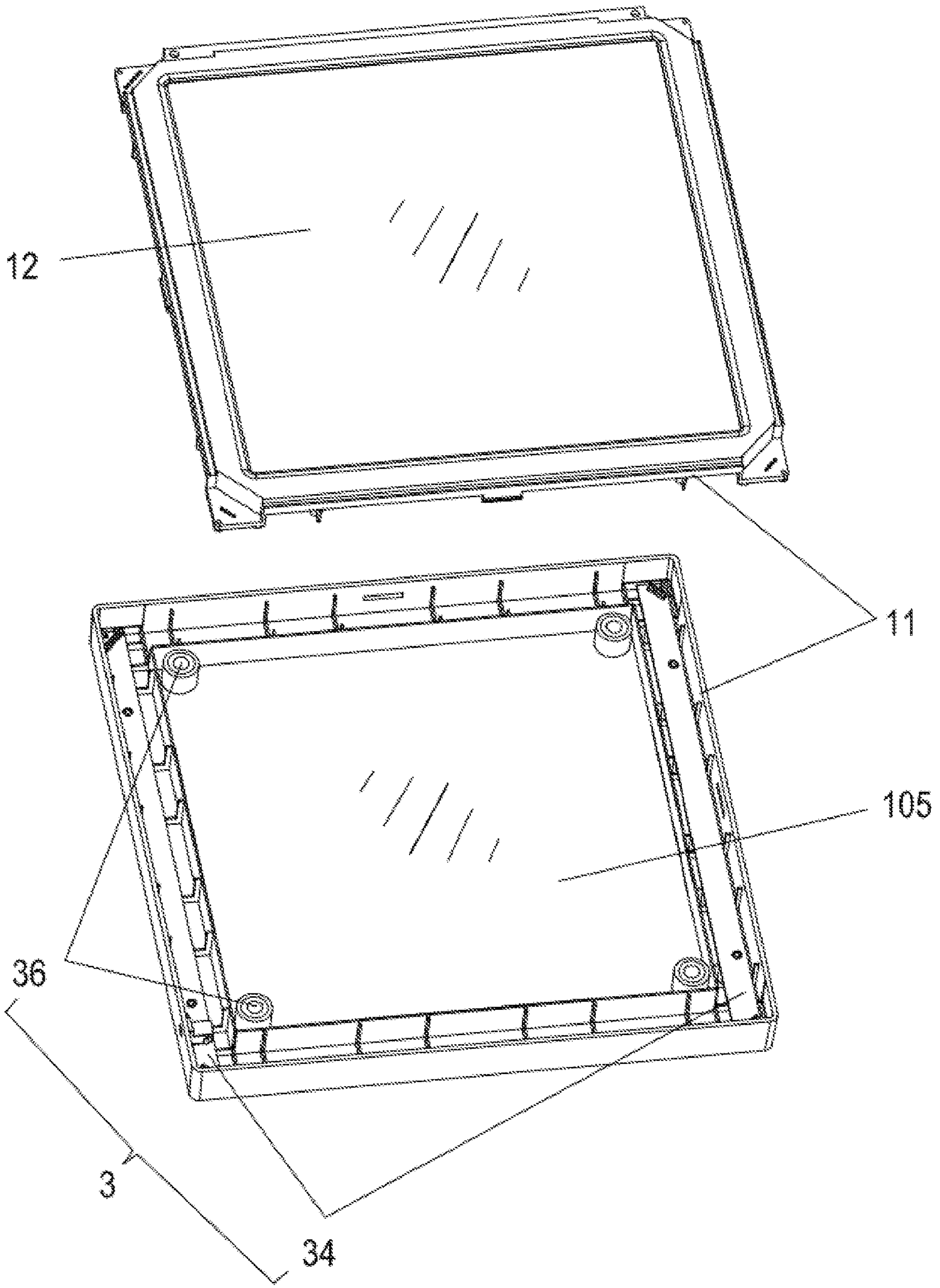
FIG. 7 is an exploded structural view of an end cover according to embodiment 2 of the present invention.

As shown in FIG. 7, embodiment 2 is different from embodiment 1 in that, spotlights 36 are used in lieu of the LED light 32 and the light guiding panel 33 of embodiment 1 in order that lights are focused on the display product. Therefore, each first lighting assembly 3 of embodiment 2 comprises the controller boards 34 and the spotlights electrically connected to the controller boards 34; the controller boards are positioned inside the surrounding groove 102, and the spotlights 36 are arranged at four corners of a middle area of a surface of each other shell 11 facing towards a vertical direction of the case body, so that lights emitted from the spotlights 36 through the cover panel 12 can be focused on the display product inside the case body 100, so as to brighten up the display product and enhance the display effect.

Further, the middle area 105 of the surface of each outer shell 11 facing towards the vertical direction of the case body is made of transparent material, wherein said middle area 105 of such surface of each outer shell 11 is all areas of such surface but areas corresponding to the groove 102. Since the LED light 32 and the light guiding panel 33 required in embodiment 1 are not required in this embodiment, and all other major components like the controller boards 34 and wires are already accommodated in the surrounding groove 102, a middle part of the middle area 105 of each outer shell 11 is basically free of any light blocking components. By making such middle area transparent, external lights can also pass through the outer shell 11 and thus the cover panel 12 and illuminate the interior of the case body 100 so that the amount of lights inside the case body is increased, thereby further brightening the display product and enhancing the product display effect.

It should be noted that, the embodiments as well as the features disclosed therein can be mutually combined to obtain new embodiments given that no contradictions are resulted.

Only the preferred embodiments of the present invention are illustrated. The described embodiments are not intended to limit the present invention in any sense. The scope of protection of the present invention is determined by the claims. Although the present invention is disclosed with reference to the above preferred embodiments, the described embodiments are not intended to limit the present invention. A person skilled in the art may change or modify the technical solutions disclosed above and obtain other embodiments of equivalent technical effects given that the changes or modifications are not deviated from the technical scheme of the present invention. Any simple changes, alternative configurations with equivalent technical effects, as well as modifications, made to the disclosed embodiments in accordance with the essence of the present invention and without deviating from the technical scheme of the present invention should still fall within the scope of the present invention.

What is claimed is:

1. A lighted product display case, comprising:

two end covers; wherein each of the end covers is provided with a first lighting assembly and a plurality of position limiting portions, the first lighting assembly comprises a plurality of first contacts positioned corresponding to the position limiting portions respectively;

a plurality of connecters; wherein each of the connecters is provided with a second lighting assembly, and the second lighting assembly comprises an LED panel and a plurality of second contacts provided at two ends of the LED panel; the second contacts are exposed from two ends of the corresponding connecter when the second lighting assembly is installed on the corresponding connecter; the first contacts of the first lighting assembly of each of the end covers are exposed to the connecters respectively;

the plurality of connecters are positioned between the two end covers, wherein said two ends of each of the connecters are inserted into one of the position limiting portions of one of the end covers and a corresponding position limiting portion of another one of the end covers respectively, so that a case body is formed, wherein the first contacts of both end covers are in contact with corresponding second contacts of the connecters, so that first lighting assemblies of both of the end covers are in contact with corresponding second lighting assemblies of the connecters;

each of the end covers comprises an outer shell and a cover panel fixed to the outer shell, the cover panel is made of light-transmitting material; the outer shell is provided with said plurality of position limiting portions of the corresponding end cover and a plurality of openings that allow corresponding first contacts of the first lighting assembly of the corresponding end cover to expose;

a first supporting frame is provided inside the outer shell of each of the end covers, a surrounding groove is formed between the first supporting frame and outer peripheries of the outer shell.

2. The lighted product display case of claim 1, wherein each first lighting assembly also comprises an LED light, a light guiding panel, and controller boards; the first contacts of the corresponding first lighting assembly are disposed on the controller boards, and a power connecter is disposed on at least one of the controller boards; the LED light is fixed to side edges of the light guiding panel, and the LED light is also electrically connected to the controller boards.

3. The lighted product display case of claim 1, wherein each first lighting assembly also comprises controller boards and spotlights electrically connected with the controller boards, and the controller boards are positioned in the surrounding groove.

4. The lighted product display case of claim 3, wherein a middle area of a surface of each outer shell facing towards a vertical direction of the case body is made of transparent material.

5. The lighted product display case of claim 1, wherein each outer shell is also provided with a second supporting frame.

6. The lighted product display case of claim 1, wherein the lighted product display case also comprises transparent side boards; each of the connecters is provided with a first locking groove on each lateral side; and a plurality of second locking grooves are provided on each of the end covers on a side facing towards the connecters; a left side and a right side of each of the transparent side boards are fitted into corresponding first locking grooves of corresponding connecters respectively, and an upper side and a bottom side of each of the transparent side boards are fitted into corresponding second locking grooves of the end covers respectively.

7. The lighted product display case of claim 6, wherein the lighted product display case also comprises a door; the door is rotatably connected to the case body.

8. The lighted product display case of claim 1, wherein an outer surface of at least one of the end covers is provided with anti-slippery gaskets.

* * * * *